United States Patent [19]
Pieper

[11] 3,942,968
[45] Mar. 9, 1976

[54] METHOD AND APPARATUS FOR MELTING AND SUBSEQUENTLY REFINING GLASS

[75] Inventor: Helmut Pieper, Lohr am Main, Germany

[73] Assignee: Nikolaus Sorg GmbH & Co., Lohr am Main, Germany

[22] Filed: Nov. 11, 1974

[21] Appl. No.: 522,972

[52] U.S. Cl. .............. 65/134; 65/136; 65/179; 65/335; 65/337; 65/347
[51] Int. Cl.² .......................................... C03B 5/02
[58] Field of Search .......... 65/134, 135, 136, 178, 65/179, 180, 335, 337, 346, 347

[56] References Cited
UNITED STATES PATENTS

| | | | |
|---|---|---|---|
| 1,598,308 | 8/1926 | Pike | 65/346 X |
| 2,686,820 | 8/1954 | Arbeit et al | 65/136 |
| 3,328,150 | 6/1967 | Rough | 65/134 X |
| 3,583,861 | 6/1971 | Preston | 65/135 |

*Primary Examiner*—Arthur D. Kellogg
*Attorney, Agent, or Firm*—Burgess, Dinklage & Sprung

[57] ABSTRACT

The present invention provides a method of melting glass, whereby in a glass melting furnace having electrodes positioned in a plurality of levels or planes the glass is melted in a vertical passage and thereafter discharged via an outlet passage at the bottom of the furnace, while the glass stream, after its upward flow, flows vertically downwards under mechanical agitation, thereafter to flow upwards for further processing or treatment. The glass stream may be additionally heated by electrical energy during its upward flow prior to the agitation.

13 Claims, 3 Drawing Figures

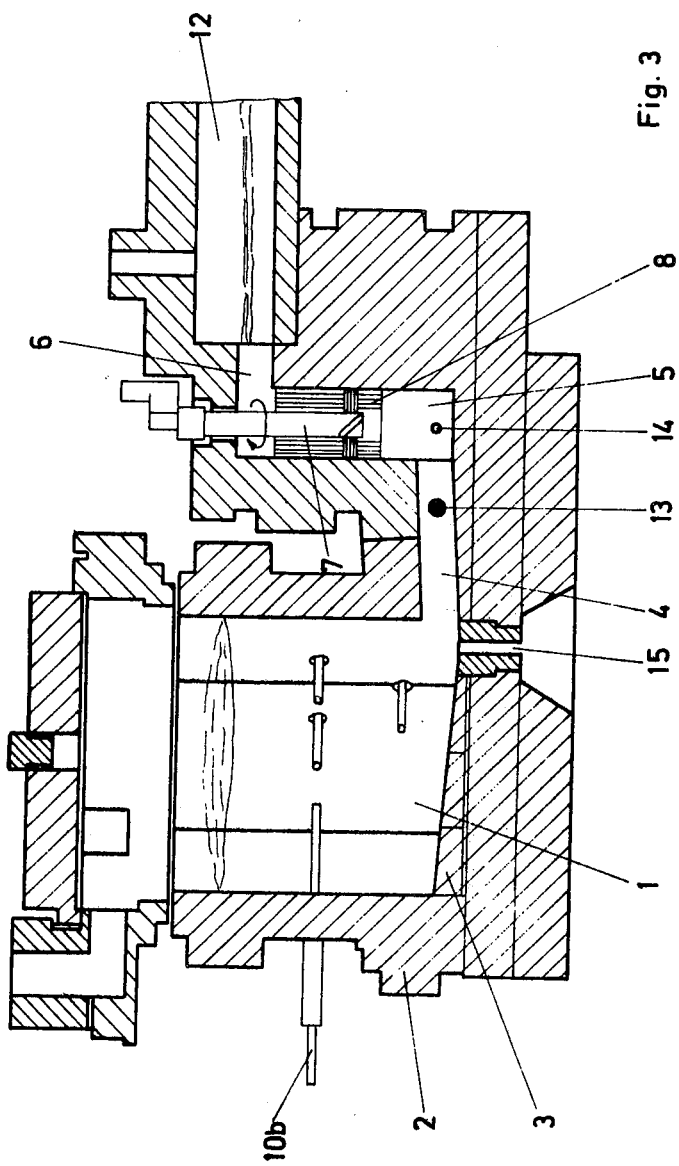

METHOD AND APPARATUS FOR MELTING AND SUBSEQUENTLY REFINING GLASS

The present invention relates to a glass melting furnace in which a mixture of the materials to be melted is fed into the upper portion of a glass melting tank or trough made of refractory bricks, wherein electrical current is applied to the molten glass through a plurality of electrodes distributed around the circumference of the furnace in one or more planes or levels thereof, and wherein the molten mixture or frit is subsequently refined and homogenized.

Electric furnaces of the abovementioned type are used particularly for the production of high-Quality glass species because the melting process and especially the refining process can be controlled more exactly than in furnaces of the conventional construction. More particularly, it is thereby possible to produce colored or stained glasses of substantially any color up to black, and to vary the coloring readily and rapidly. Furthermore, electric furnaces are of great advantage for the melting of lead crystal glass in great quantities, whereby it is of special importance to obtain a sufficient refining and homogeneity of the discharged glass in order to provide for high brilliancy and strength of the glass.

From the German patent application No. 1,916,804 laid open to public inspection, there is already known a furnace wherein the supply of the electrical current is effected in several planes or levels and wherein a refining zone is provided below the melting planes in which zone the refining of the molten glass should be achieved by supplying radiated heat thereto. However, as disadvantage it has been found in these conventional furnace that a complete homogenization of the discharged glass is not possible, and that, further, the refining zone or refining compartment necessitates an increased height of the furnace, this resulting in unnecessary expenditure because of the unnecessary increase of volume.

In view of these facts, it is the object of the present invention to provide a method and an apparatus for the melting of glass which do no longer show the previous disadvantages and which, in particular, allow to produce a particularly well refined and homogenized glass with minimum expenditure and minimum volume of the furnace.

This object of the invention is solved by the measures as specified in the claims. Primarily, it has been found to be essential that in the furnace proper a complete melting of the mixture or frit supplied onto the molten bath is effected while supplying high amounts of energy as compared with the conventional method, that the molten glass is heated to a sufficiently high temperature so as to obtain a sufficient degassing effect, and that the glass is then withdrawn or discharged immediately and without any further processing, and homogenized and refined in a subsequent treatment cell. The transfer to the refining cell or to the method step of the refining, respectively, is performed by an upward flow of the glass with the application of additional energy in order to avoid a lowering of the temperature, whereupon the glass is refined while being conducted below a free surface and with subsequent agitation. Agitation is effected in such a manner that the flow direction of the agitator which acts upon the full volume of the glass, is in opposition to the flow direction of the glass. This refining action is achieved by an agitator positioned within a circular passage, whereby the ends of the blades or vanes extend to a point closely adjacent the periphery of the passage and the blades are mounted obliquely such that the lower edges of the blades are leading in the direction of rotation and define a flow direction extending upwards.

The refining and degassing actions can be further intensified by subjecting the free surface to a vacuum in the region preceding the downward flow and agitation.

In the following, exemplary embodiments of the invention are described in greater detail by referring to the enclosed drawings, wherein:

FIG. 3 is a view of the furnace including a refining agitator disposed within the riser.

Figure 1:
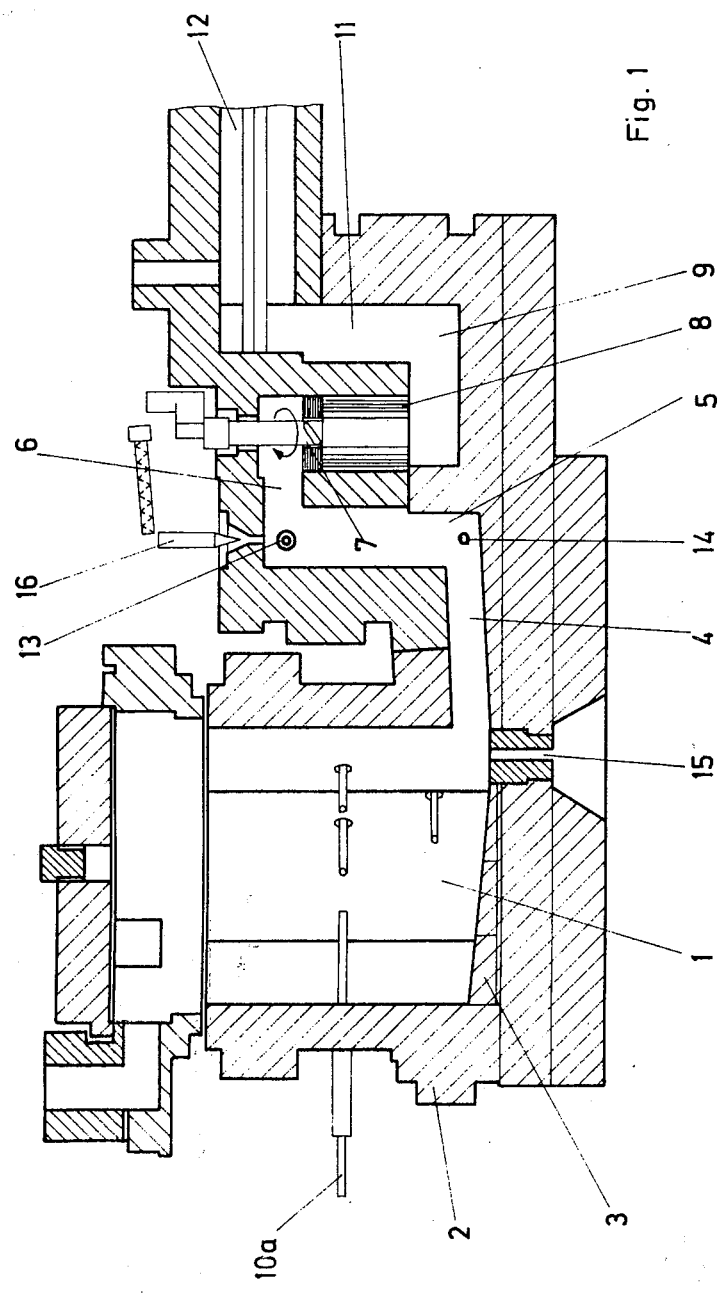
FIG. 1 shows a schematic sectional view of a glass melting furnace according to the present invention and including one plane or level of electrodes.
Figure 2:
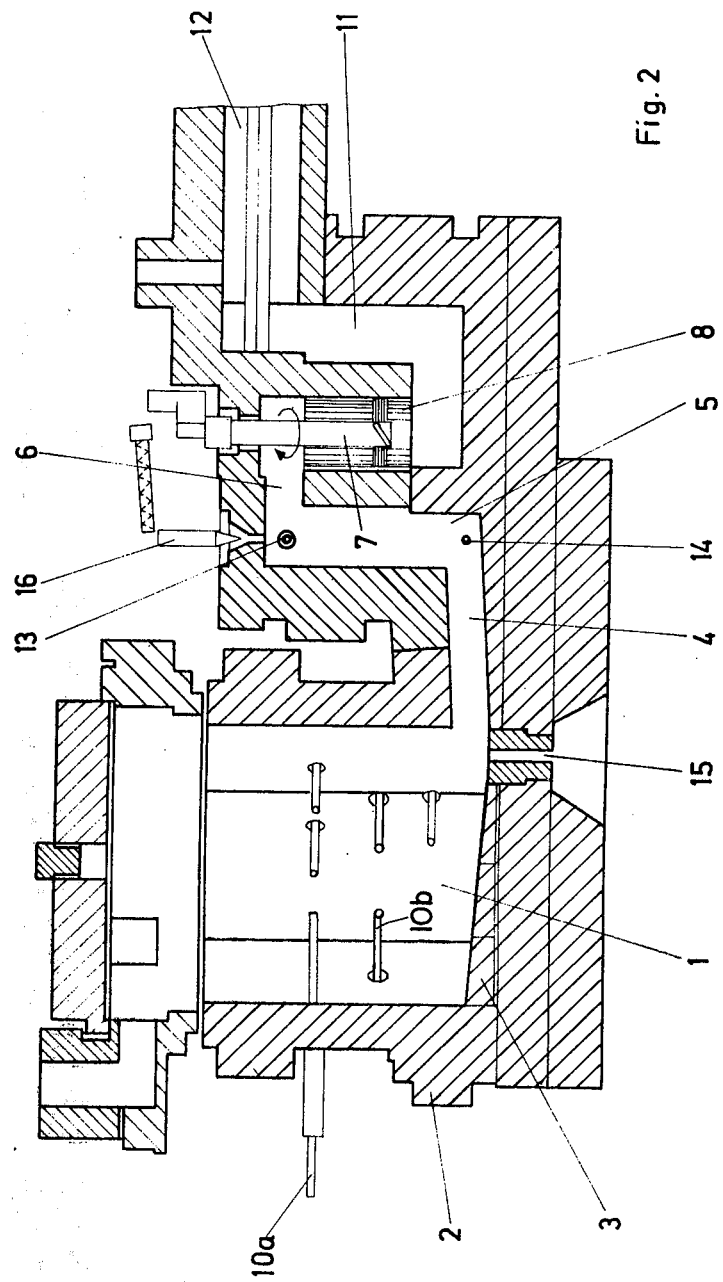
FIG. 2 shows a similar view of the furnace according to FIG. 1 and including a plurality of planes or levels of electrodes.

As shown in the Figures, the vertical electric glass melting furnace according to the invention comprises a furnace chamber 1 formed of a refractory material and having a bottom 3, as well as a peripheral jacket 2 supported by a not illustrated supporting frame. The refractory material may have an insulation at its exterior surface, whereby this insulation may be omitted in the region of the electrodes 10, 13 and 14 for facilitated control of the electrode holders.

The furnace chamber 1 has a preferably central sunk drain 15 by means of which the furnace chamber may be drained and which is normally closed by means of a not illustrated stopper.

The glass is withdrawn or discharged from the furnace chamber 1 through an outlet 4 which merges into a rising glass passage (riser) 5 which passes into a horizontal glass passage 6, with the latter in turn joining with a vertically downwardly extending glass passage 8 having a circular cross-section. Then, the glass flows through another horizontal glass passage 9 and a further riser 11 into a feeder 12 wherein the glass is further processed or from which it can be withdrawn.

A plurality of electrodes 10 positioned in one or more planes extend into the furnace chamber 1, whereby the electrodes of the upper plane are indicated at 10a and the electrodes which optionally may be positioned therebelow, are indicated at 10b.

Apparently, there may be provided not only one or two electrode planes; rather, the electrodes may be arranged also in three or more planes.

The furnace chamber 1 per se has the configuration of a regular polygonal, and it has normally six or four corners. Advantageously, the number of the corners may increase with increasing size of the furnace, and the electrodes provided in each plane or level may be present in numbers of three, six or more electrodes. Preferably, for a furnace having a great number of corners, a great number of electrodes in each plane is chosen, too.

Now, if a plurality of planes of electrodes are provided, the electrodes in the individual planes are staggered relative to each other in such a way that the innermost ends of the electrodes of one plane are aligned within the furnace with the gaps or spaces between the ends of the electrodes in the planes thereabove and therebelow so as to produce circulating glass flows in said planes in such a manner that a rising glass flow of the respective lower plane intercepts a descending glass flow of the respective plane thereabove at the interface between these planes, such that the glass flows deflect each other and penetration of the glass flows into the respectively other plane is avoided.

More particularly, this should serve to prevent descending of cold flows along the furnace wall because such descent would permit not yet melted mixture particles to flow into the outlet 4 of the furnace.

The upper side of the furnace chamber 1 is closed by an arched roof which has opening thereinto a smokestack for operating an oil burner for the auxiliary or initial heating of the mixture or of the furnace.

The riser 5 joining the outlet 4 includes a pair of superposed electrodess 13 and 14 whereby a supply means 16 for glass (color) frits, glass particles or liquid colored glass is provided in an extension of a vertical line passing upwards through the electrodes. The riser 5 is followed by a vertical glass passage 6 which has a free surface for the degassing of the molten glass bath and whereby the space above the glass surface may be subjected to an adjustable vacuum in order to intensify the degassing action.

The passage 6 is joined by a vertically descending passage 8 having a circular cross-section and in which an agitator mechanism 7 is adapted to be rotated. The blades or vanes of this agitator 7 extend to a point closely adjacent the periphery of the passage 8, and the blades are inclined in such a manner that their leading edges are in the lowermost position so that, with the agitator rotating in the direction as indicated by the arrows in the Figures, a pumping action in upward direction, i.e. in opposition to the flow of glass, is produced.

In another embodiment of the invention, the agitator may be positioned also within the riser 5. Hereby, attention has to be paid merely to the fact that in this case, too, the leading edges of the vanes are at the rear in the direction of flow, such that the agitating action is in opposition to the flow of glass.

The descending passage 8 merges into a horizontal passage 9 which is connected to another rising passage 11 through which the glass may flow into a conventional feeder for the further processing thereof.

Thus, the supplied quantity of mixture is melted within the furnace chamber 1 and then, without any further refining action taking place within the furnace, refined, homogenized and degassed within the refining portion 5 to 8 such that it is possible, in a manner being surprising to the expert, to obtain a quality of the glass which could not be achieved heretofore, with minimum heights of construction and with smallest useful volume of the furnace. Optionally the blades or vanes may be located only just below the free surface of the glass (FIG. 1) thus obtaining a better refining and degassing effect.

What we claim is:

1. Method for melting and refining glass which comprises electrically melting glass in a melting furnace having one or more levels of electrodes extending into the melting furnace and refining the molten glass in a vertical circular passage by subjecting same to mechanical agitation using an agitator positioned within the vertical circular passage with the ends of the agitator blades extending to a point closely adjacent the periphery of the passage whereby the agitator acts on the full volume of the molten glass.

2. Method of claim 1 wherein the molten glass being refined flows downward in the circular passage and the agitator acts on the molten glass with a flow direction opposite to the flow of the molten glass.

3. Method of claim 1 wherein the molten glass being refined flows upward in the circular passage and the agitator acts on the molten glass with a flow direction opposite to the flow of the molten glass.

4. Method of claim 1 wherein circulating glass flows are produced within planes of the melting furnace having a plurality of levels of electrodes, such that a rising glass flow of a respective lower plane intercepts a descending glass flow at the interface between said planes, and such that said glass flows deflect each other thereby avoiding penetration of said glass flows into the other respective plane.

5. Method for melting and refining glass which comprises:
   i. supplying a mixture or frit of the required raw materials to an electric glass melting furnace having one or more levels of electrodes extending into the furnace thereby forming an interface between the mixture and a molten glass mass;
   ii. withdrawing molten glass adjacent or through the bottom of the melting furnace;
   iii. causing the molten glass to flow upward while applying additional electrical energy to prevent lowering of the temperature of the molten glass;
   iv. then causing the molten glass to flow horizontally under a free surface while applying a vacuum thereabove to intensify the refining action;
   v. thereafter causing the molten glass to flow downward while being subjected to mechanical agitation using an agitator positioned within a circular passage with the ends of the agitator blades extending to a point closely adjacent the periphery of the passage, the agitator acting on the full volume of the glass with a flow direction opposite to the flow of the glass; and
   vi. thereafter causing the glass to again flow upward for further processing or treatment.

6. Method of claim 5 wherein circulating glass flows are produced within planes of the melting furnace having a plurality of levels of electrodes, such that a rising glass flow of a respective lower plane intercepts a descending glass flow at the interface between said planes, and such that said glass flows deflect each other thereby avoiding penetration of said glass flows into the other respective plane.

7. Glass melting and refining apparatus comprising melting furnace means having electrodes positioned in one or more levels spaced around the circumference of said furnace means and serving to supply electrical energy thereto, and refining means comprising vertical circular passage means connected to the furnace means having positioned therein agitator means having horizontally rotating blades which extend to a point closely adjacent the wall of said passage.

8. Apparatus of claim 7 wherein a plurality of levels of electrodes are provided, the innermost ends of the electrodes in one level being aligned with the gaps between the ends of the electrodes in the levels thereabove and therebelow.

9. Apparatus of claim 7 wherein upwardly extending riser passage means connects the furnace and refining means, said riser passage means having positioned therein superposed electrodes for supplying additional energy, said vertical circular passage means being a downwardly extending glass passage from said riser passage means.

10. Apparatus of claim 9 wherein the agitator means is positioned in the vertical passage means at a lower point in the flow direction of the downwardly flowing glass and rotates so as to produce a flow in opposition to the direction of flow of the glass.

11. Apparatus of claim 9 wherein a connecting passage is provided between the upwardly extending riser passage means and the downwardly extending vertical passage means, said connecting passage having means to create a vacuum therein.

12. Apparatus of claim 9 wherein supply means are provided for adding color frits or colored glass in solid or liquid form to the riser passage means.

13. Apparatus of claim 6 wherein the vertical passage means is an upwardly extending riser passage and the agitator means rotate so as to produce a flow in opposition to the direction of flow of the glass.

* * * * *